Patented July 24, 1951

2,561,893

UNITED STATES PATENT OFFICE 2,561,893

ETHYL CELLULOSE STABILIZED WITH AN ORGANIC COPPER SALT

Peter Van Wyck, Wilmington, Del., assignor to Hercules Powder Company, Wilmington, Del., a corporation of Delaware No Drawing. Original application June 10, 1944, Serial No. 539,793, now Patent No. 2,445,374, dated July 20, 1948. Divided and this application May 7, 1948, Serial No. 25,794

8 Claims. (Cl. 106—194)

This invention relates to compositions of stabilized ethyl cellulose which retain their viscosity and good color after exposure to heat and oxygen.

It has been previously recognized that cellulose ethers must be so prepared as to withstand the degradation effects of heat and oxygen. Although various methods of stabilizing cellulose ethers to make them resistant to decomposition have been suggested, such as hydrogenation, treatment with diazomethane, etc., no simple means of stabilization has proved thoroughly satisfactory.

Prolonged storage of the flake, and the heat and oxygen present during molding operations cause embrittlement of the compositions made therefrom, due to viscosity degradation of the ether and, in addition thereto, objectionable color formation. Previously proposed methods of stabilizing cellulose ethers, such as low pH adjustment of the flake, sometimes correct one or the other of these defects, but the simultaneous stabilization of both color and viscosity to a satisfactory degree is difficult, and usually impossible, to perform by previously known procedures. To obtain a satisfactory end product, such as film, lacquer or molded article, it is necessary to have flake stability as well as composition stability, since, without the former, the latter is usually impossible.

Now, in accordance with this invention, the viscosity stability of cellulose ethers and of their compositions has been greatly improved, while maintaining good color stability, by the addition of a material containing copper in free or combined state, either to the flake or to the ether composition. It has been found that copper and copper compounds exert a definite stabilizing effect on cellulose ethers or their compositions, protecting them from degradation when exposed to heat or oxygen.

As illustrative of carrying out the invention, the following examples are typical:

EXAMPLE 1

A medium-viscosity ethyl cellulose was dissolved in 70-30 toluene-alcohol. To portions of this solution were added the amounts indicated in Table I of powdered copper and various copper compounds. Films were cast from the solutions, and the films thus formed were heated for 16 hours at 120° C. in air, after which they were tested, as hereinafter described, for viscosity. Viscosity measurements were also made on portions of the films before heat-treatment. Table I compares results obtained with original (unstabilized) and stabilized ethyl cellulose.

TABLE I

| Stabilizer | Per Cent Cu in Film | Per Cent Retention of Viscosity After 16 Hours at 120° C. |
|---|---|---|
| No Stabilizer | 0 | 42.7 |
| Powdered copper | 0.0015 | 93.4 |
| Cupric nitrate | 0.0012 | 96.5 |
| Cupric sulfate | 0.0010 | 89.8 |
| Cupric chloride | 0.0015 | 89.8 |
| Cuprous chloride | 0.0015 | 81.5 |
| Cupric phosphate | 0.0015 | 51.3 |
| Cupric carbonate | 0.0010 | 55.4 |
| Copper arsenate | 0.0015 | 53.5 |
| Cupric oxide | 0.0014 | 87.3 |
| Copper ammonium chloride | 0.0015 | 90.7 |
| Copper acetate | 0.0016 | 87.6 |
| Copper citrate | 0.0015 | 60.7 |
| Copper benzoyl benzoate | 0.0013 | 89.0 |

EXAMPLE 2

To 100 grams of granular medium-viscosity ethyl cellulose (44.7% ethoxyl) was added 600 grams of 30% isopropyl alcohol. To this suspension, 0.025 gram hydrated cupric acetate

[Cu(C₂H₃O₂)₂·H₂O]

was added with stirring. After mild agitation for 2 hours, the ethyl cellulose was drained and then dried at 70° C. in vacuum. Substantially all of the copper compound was absorbed.

EXAMPLE 3

To 100 grams of dry ethyl cellulose, identical with that used in Example 2, was added 600 grams of distilled water. To this suspension, an aqueous solution containing 0.0375 gram of hydrated cupric acetate was added with stirring. Agitation, draining, and drying were carried out as in Example 2. Substantially all of the copper compound was absorbed.

EXAMPLE 4

To 400 grams of flake ethyl cellulose, identical with that used in Examples 2 and 3, was added 0.15 gram of hydrated cupric acetate which had previously been ground to pass a 100-mesh sieve. The copper compound was uniformly distributed by subsequent tumbling for 15 minutes.

Table II presents a comparison between the untreated ethyl cellulose and the stabilized ethyl cellulose produced by the method described in Examples 2, 3, and 4.

TABLE II

| Sample | Original Viscosity | Viscosity After Heat-Treatment of 1½ Hrs. at 160° C. | Film Color After Heat-Treatment |
|---|---|---|---|
| Untreated ethyl cellulose. | 358 | 16 | Light brown. |
| Ethyl cellulose from Example 2. | 328 | 152 | Very light tan, color just noticeable. |
| Ethyl cellulose from Example 3. | 320 | 139 | Do. |
| Ethyl cellulose from Example 4. | 333 | 114 | Do. |

EXAMPLE 5

To 200 grams of medium-viscosity ethyl cellulose (44.5% ethoxyl) were added 200 grams of water and 850 grams of 41% isopropyl alcohol to give a final mixture containing 33% isopropyl alcohol based on the total weight of the liquid present. The pH of the mixture was adjusted to 3.6 with glacial acetic acid, after which 0.024 gram hydrated cupric acetate was added. The sample was stirred, drained, and dried as described in Example 2.

EXAMPLE 6

Example 5 was repeated, the only change being that a pH of 7.1 was used instead of the pH used in Example 5.

EXAMPLE 7

Example 5 was repeated, the only change being that a pH of 8.2 was used instead of the pH used in Example 5.

Table III presents a comparison between the untreated ethyl cellulose and the ethyl celluloses prepared according to the methods described in Examples 5, 6, and 7.

TABLE III

| Sample | Viscosity After Heating 1½ Hrs. at 160° C. | Original Viscosity | Spectrographic Copper Analyses |
|---|---|---|---|
| | | | Per cent |
| Untreated ethyl cellulose | 18 | 123 | 0.000 |
| Ethyl cellulose from Example 5 | 42 | 109 | 0.0026 |
| Ethyl cellulose from Example 6 | 66 | 142 | 0.0039 |
| Ethyl cellulose from Example 7 | 61 | 112 | 0.0055 |

EXAMPLE 8

Medium-viscosity ethyl cellulose (46.5% ethoxyl) was treated with dilute acid according to the method described in U. S. Patent No. 1,448,091. To 400 grams of the resulting ash-free product was added 2,000 grams of 35% isopropyl alcohol containing 0.048 gram cupric chloride. The ethyl cellulose was stirred, drained, and dried as described in Example 2 above.

EXAMPLE 9

Ethyl cellulose, identical with that used in Example 8, was treated according to the method described in U. S. Patent No. 1,448,091. To 400 grams of the resulting ash-free product, suspended in 2,000 grams of 35% isopropyl alcohol, was added 0.02 gram cuprammonium hydroxide. Stirring, draining, and drying were carried out as described in Example 2.

Table IV presents a comparison between the ash-free ethyl cellulose and the ethyl celluloses resulting from the treatments described in Examples 8 and 9.

As Table I shows, a wide variety of copper stabilizers is available. These include the inorganic salts, such as the sulfates, nitrates, arsenates, chlorides, carbonates, and phosphates; the or-

TABLE IV

*Stability data on Examples 8 and 9*

| Sample | Original Viscosity | Viscosity After 1½ Hrs. at 160° C. | Ash as Na₂CO₃ | Copper Added in P. P. M. E. C. | Copper Analysis P. P. M. of E. C. |
|---|---|---|---|---|---|
| | | | Per cent | | |
| Ash-free ethyl cellulose | 94 | 3.0 | nil | 0 | 0 |
| Ethyl cellulose from Example 8 | 94 | 80.0 | 0.010 | 120 | 17 |
| Ethyl cellulose from Example 9 | 94 | 60.0 | 0.020 | 50 | 37 | ganic derivatives, such as the citrates, acetates, and benzoates; complexes, such as cuprammonium hydroxide and chloride; and copper itself, in the form of copper or bronze dusts.

The stabilizers are effective in very small proportions, as shown by the tables and examples. From about 0.001% to 0.005% is a convenient range of copper concentration which gives effective stabilization; in general, a quantity between about 0.0005% and 0.03% is preferred. When relatively inactive substances, such as copper naphthenate or copper oxalate, are used, as much as about 1% may be necessary; but with the most active agents, such as copper nitrate (see Table V), as little as about 0.0002% gives satisfactory stabilization. In general, for all stabilizers, a sufficient quantity to stabilize the ether, within the range between 0.0002% and 1%, the percentage being that of copper on the basis of the cellulose ether stabilized, is utilized. Copper, in the form of copper nitrate, was incorporated in films in the quantities shown, after which the films were heat-treated in the manner hereinafter described.

TABLE V

| Per Cent Cu in Film | Per Cent Retention of Viscosity After 16 Hours at 120° C. |
|---|---|
| 0 | 42.7 |
| 0.00013 | 46.5 |
| 0.00026 | 78.3 |
| 0.00039 | 86.0 |
| 0.00078 | 87.0 |

These data show that 0.00013% copper produces little stabilization. While 0.00026% copper gives very satisfactory stability, and, indeed, while quantities as low as about 0.0002% are effective, it is advisable to add a minimum of about 0.0005% to insure good stability throughout a large mass of plastic composition, wherein perfect uniformity of distribution might be difficult to obtain.

While ethyl cellulose is used in the examples to illustrate the invention, these stabilization treatments apply equally well to cellulose ethers generally, for example, other alkyl cellulose ethers such as methyl cellulose and propyl cellulose; aralkyl ethers such as benzyl cellulose; mixed ethers such as methyl-ethyl, methyl-benzyl, or ethyl-benzyl celluloses; carboxy ethers such as sodium carboxymethylcellulose. Water-soluble ethers and organic solvent-soluble types of ethers are included. All cellulose ethers are subject to the degradation processes herein described which occur when said ethers are subjected to heating and oxidation. The addition of copper or copper compounds to such ethers or their compositions constitutes an effective means for minimizing or changing the degradation mechanisms.

The degree of substitution and viscosity of the cellulose ethers do not affect the stabilizing action of the added copper or copper compounds. When ethyl cellulose is used, the commercially available types usually contain between about 44.5% and 50% ethoxyl. For molded articles, a viscosity of about 100 centipoises is usually used, and films are frequently made up of 50-centipoise viscosity grade. Lower viscosity grades are usually used in lacquers, varnishes, etc., principally material of about 22 centipoises or less. All are effectively stabilized in accordance with this invention.

Plasticizers for cellulose ethers, such as tributylphosphate, tricresylphosphate, triphenylphosphate, dimethyl phthalate, diethyl phthalate, dibutyl phthalate, diamyl phthalate, diphenyl phthalate; vegetable oil fatty acids, such as castor oil fatty acids; fatty alcohols, such as lauryl alcohol; vegetable oils and mineral oil, linseed oil, etc., may be incorporated in an amount necessary to the particular use to which the composition is to be put. In addition, there may be mixed with the cellulose ethers various compatible resins, such as wood rosin, hydrogenated rosin, gum Congo, dammar, cumar, phenolics, modified phenolics, alkyds, ester gum, shellac, etc., as well as fillers pigments, and coloring matter. Swelling agents, such as methyl alcohol, ethyl alcohol, and mixed solvents, such as ethyl alcohol and acetone, may be used instead of the isopropyl alcohol shown in Example 2.

The amount of swelling agent used in the steeping bath is subject to wide variation, dependent upon the specific swelling agents, the steeping time, and the temperature employed. Concentrations between about 15% and 40% of the swelling agent have been found suitable. However, use of a swelling agent is not essential.

The temperature of the steeping treatment may vary between about 0° C. and about 100° C., but the range between about 15° C. and about 70° C. is preferred. The time of steeping may be from about 5 minutes to several hours, but about 30 to 60 minutes is a preferred period. If no swelling agent is used, as in Example 3, the steeping time is usually between about 1 to 3 hours.

As shown by Example 4, an effective way of adding powdered copper compounds is by incorporation with the dry grains, involving a simple tumbling operation to effect distribution. Although the use of copper acetate is shown by Example 4, bronze dust, copper dust, or finely-divided copper compounds other than the acetate may be added in the same manner. Another useful method of copper stabilization is the addition of copper or copper compounds during molding powder formation or in lacquer formation.

The stability tests carried out on samples shown in Tables I and V involved the heating of films at 120° C. for 16 hours. The remaining samples were tested by the following method: Films 0.1 to 0.15 millimeter in thickness were prepared by spreading, on glass plates, 12.5% solutions of the ethyl cellulose dissolved in 70–30 toluene-alcohol. The film was dried in air for 3 hours and in an oven at 70° C. for 2 hours. Sections of the film 6 by 3 inches were then cut and pleated by folding in accordion shape and placed in the bottom of a 10-inch test tube which was left open at the top. The test tube with the inserted film was placed in a forced draft oven adjusted to 160° C. ±1° C. and heated for 1½ hours. The film was then removed, immediately placed in a stoppered bottle, weighed after cooling, and made up to a 5% solution in 80–20 toluene-alcohol. The viscosity of the heat-degraded film solution was then measured at 25° C. and compared with the viscosity of another portion of the same film which had not been given the heat-treatment.

As shown by Table I, copper stabilization is effective regardless of the anionic component which has been added. However, as shown by Table III, the pH at which copper treatment is carried out usually predetermines the extent to which the copper compound is absorbed by the cellulose ether. While this table shows that the absorption of copper occurs over a wide pH range, the higher pH's cause greater copper absorption and, hence, are to be preferred.

The majority of treatments to which cellulose ethers are normally subjected for ash removal or viscosity degradation cause viscosity instability of the resultant product. However, as shown by Examples 8 and 9, this adverse acidic condition is counteracted by the addition of copper to the unstable material.

The advantages of the use of copper and copper compounds as stabilizers for cellulose ethers reside in the following: The copper and copper compounds are easily incorporated with the ethers at any stage of the aftertreatment or during lacquer or plastic formation; unlike numerous other stabilizers, viscosity is effectively protected against degradation by heat or oxygen without the concurrent formation of objectionable colored decomposition products; the extent of stabilization is excellent and superior to that obtained with most other stabilizers; and only extremely minute quantities of the stabilizers are ordinarily needed.

Thus, according to the present invention, copper-containing materials have been found to be very effective heat stabilizers for cellulose ethers and their compositions, with or without plasticizers and other ingredients. The terms "copper-containing materials" and "materials containing copper" are meant to include copper per se, bronzes and brasses, inorganic compounds and organic copper compounds. All concentrations discussed or claimed will be understood to mean percentage of copper in the cellulose ether, not percentage of copper-containing material in the ether.

This application is a division of my application, Serial No. 539,793, filed June 10, 1944, now Patent No. 2,445,371, issued July 20, 1948.

What I claim and desire to protect by Letters Patent is:

1. As a new composition of matter, an ethyl cellulose characterized by the presence therein of an agent capable of stabilizing the ether against the degrading effects of heat and oxygen without reducing the viscosity of the ether, said agent being an organic salt of copper of the group consisting of copper acetate, copper citrate, copper benzoyl benzoate, copper naphthenate, and copper oxalate in a sufficient amount to stabilize the ether within the range from about 0.0002% to about 1% of copper based on the weight of the ether.

2. As a new composition of matter, an ethyl cellulose characterized by the presence therein of an agent capable of stabilizing the ether against the degrading effects of heat and oxygen without reducing the viscosity of the ether, said agent being copper acetate in a sufficient amount to stabilize the ether within the range from about 0.0002% to about 1% of copper based on the weight of the ether.

3. As a new composition of matter, an ethyl cellulose characterized by the presence therein of an agent capable of stabilizing the ether against the degrading effects of heat and oxygen without reducing the viscosity of the ether, said agent being copper citrate in a sufficient amount to stabilize the ether within the range from about 0.0002% to about 1% of copper based on the weight of the ether.

4. As a new composition of matter, an ethyl cellulose characterized by the presence therein of an agent capable of stabilizing the ether against the degrading effects of heat and oxygen without reducing the viscosity of the ether, said agent being copper benzoyl benzoate in a sufficient amount to stabilize the ether within the range from about 0.0002% to about 1% of copper based on the weight of the ether.

5. An ethyl cellulose plastic composition characterized by the presence therein of an agent capable of stabilizing the composition against the degrading effects of heat without reducing the viscosity of the composition, said agent being an organic salt of copper of the group consisting of copper acetate, copper citrate, copper benzoyl benzoate, copper naphthenate, and copper oxalate present in a sufficient amount to stabilize the ether within the range from about 0.002% to about 1% of copper based on the weight of the ether.

6. As a new composition of matter, granular ethyl cellulose characterized by the presence therein of an agent capable of stabilizing the ethyl cellulose against the degrading effects of heat and oxygen without reducing the viscosity of the ether, said agent being an organic salt of copper of the group consisting of copper acetate, copper citrate, copper benzoyl benzoate, copper naphthenate, and copper oxalate in a sufficient amount to stabilize the ether within the range from about 0.0002% to about 1% of copper based on the weight of the ether.

7. As a new composition of matter, an ethyl cellulose characterized by the presence therein of an agent capable of stabilizing the ether against the degrading effects of heat and oxygen without reducing the viscosity of the ether, said agent being copper naphthenate in an amount about 1% of copper based on the weight of the ether.

8. As a new composition of matter, an ethyl cellulose characterized by the presence therein of an agent capable of stabilizing the ether against the degrading effects of heat and oxygen without reducing the viscosity of the ether, said agent being copper oxalate in an amount about 1% of copper based on the weight of the ether.

PETER VAN WYCK.

REFERENCES CITED

The following references are of record in the file of this patent:

UNITED STATES PATENTS

| Number | Name | Date |
| --- | --- | --- |
| 1,813,664 | Christiansen | July 7, 1931 |
| 2,086,543 | Dreyfus | July 13, 1937 |
| 2,137,994 | Whipple | Nov. 22, 1938 |
| 2,333,577 | Koch | Nov. 2, 1943 |
| 2,445,374 | Van Wyck | July 20, 1948 |

Certificate of Correction

Patent No. 2,561,893

July 24, 1951

PETER VAN WYCK

It is hereby certified that error appears in the printed specification of the above numbered patent requiring correction as follows:

Column 6, line 71, for the patent number "2,445,371" read *2,445,374*;

and that the said Letters Patent should be read as corrected above, so that the same may conform to the record of the case in the Patent Office.

Signed and sealed this 2nd day of October, A. D. 1951.

[SEAL]

THOMAS F. MURPHY,
*Assistant Commissioner of Patents.*